US012687728B2

(12) United States Patent
Adams et al.

(10) Patent No.: US 12,687,728 B2
(45) Date of Patent: Jul. 21, 2026

(54) ADJUSTABLE BAND FOR HEAD-MOUNTED DISPLAY

(71) Applicant: Meta Platforms Technologies, LLC, Menlo Park, CA (US)

(72) Inventors: Andre Adams, Felton, CA (US); Balaji Chelladurai, Kent, WA (US); David Edwin Stroud, Soquel, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/988,042

(22) Filed: Dec. 19, 2024

(65) Prior Publication Data

US 2025/0199323 A1 Jun. 19, 2025

Related U.S. Application Data

(60) Provisional application No. 63/612,189, filed on Dec. 19, 2023.

(51) Int. Cl.
*G02B 27/01* (2006.01)
(52) U.S. Cl.
CPC ................................ *G02B 27/0176* (2013.01)
(58) Field of Classification Search
None
See application file for complete search history.

(56) References Cited

U.S. PATENT DOCUMENTS

| | | | | |
|---|---|---|---|---|
| 12,066,148 | B1 * | 8/2024 | Tompkins | ............... F16D 51/46 |
| 2005/0262619 | A1 * | 12/2005 | Musal | .................... A42B 3/066 |
| | | | | 2/421 |
| 2007/0266481 | A1 * | 11/2007 | Alexander | ............. A42B 3/145 |
| | | | | 2/414 |

(Continued)

FOREIGN PATENT DOCUMENTS

CN 104984483 A * 10/2015

OTHER PUBLICATIONS

CN 104984483 translation (Year: 2015).*

(Continued)

*Primary Examiner* — Dorothy Harris
(74) *Attorney, Agent, or Firm* — McDermott Will & Schulte LLP

(57) ABSTRACT

As disclosed herein, an apparatus for adjusting a tension of a headband of a head-mounted display (HMD) is provided. The apparatus may include a base plate including a stationary ratchet drum. The apparatus may include a rotating cap positioned over at least the stationary ratchet drum to define an internal space therebetween. The rotating cap may include multiple walled structures projecting from an inner surface of the rotating cap and into the internal space. The apparatus may include a ratchet positioned in the internal space. The ratchet may include multiple pawls. Each pawl may include a head. The head may include a first protrusion projecting transversely to the head and a second protrusion projecting transversely to the first protrusion. The first protrusion may be received within a corresponding walled structure, and the corresponding walled structure may be configured to guide a pivoting movement of the pawl.

20 Claims, 13 Drawing Sheets

(56)  References Cited

U.S. PATENT DOCUMENTS

| 2010/0064405 A1* | 3/2010 | Mcgovern ............... A42B 3/225 |
| | | 2/424 |
| 2015/0059065 A1* | 3/2015 | Klotz ..................... A42B 3/145 |
| | | 2/418 |
| 2018/0003984 A1* | 1/2018 | Lai ............................ A42B 7/00 |
| 2021/0381639 A1* | 12/2021 | Howard ............. G02B 27/0176 |
| 2022/0299779 A1* | 9/2022 | Zhang .................. H05K 5/0217 |
| 2022/0299781 A1* | 9/2022 | Ran .................... G02B 27/0172 |
| 2023/0324698 A1* | 10/2023 | Weiss ................ G02B 27/0176 |
| | | 345/8 |
| 2025/0147325 A1* | 5/2025 | Zhang ............... G02B 27/0176 |

OTHER PUBLICATIONS

EPO—International Search Report and Written Opinion for International Application No. PCT/US2024/061143, mailed Mar. 26, 2025, 13 pages.

* cited by examiner

700

CW Rotation    770    721    710

740    701 { 704    702

CCW Rotation 700    703    705    710

711

715    770    703

721

703

740    712    719    744    746

ADJUSTABLE BAND FOR HEAD-MOUNTED DISPLAY

CROSS-REFERENCE TO RELATED APPLICATIONS

The present application claims the benefit of priority under 35 U.S.C. § 119 from U.S. Provisional Patent Application Ser. No. 63/612,189 entitled "ADJUSTABLE BAND FOR HEAD-MOUNTED DISPLAY," filed on Dec. 19, 2023, the disclosure of which is hereby incorporated by reference in its entirety for all purposes.

BACKGROUND

Field

The present disclosure generally relates to artificial reality systems. More particularly, the present disclosure relates to an adjustable headband for a head-mounted display (HMD) used in artificial reality systems.

Related Art

Artificial reality is a form of reality that has been adjusted in some manner before presentation to a user, which may include, for example, a virtual reality (VR), an augmented reality (AR), a mixed reality (MR), a hybrid reality, or some combination and/or derivative thereof. Artificial reality content may include completely generated content or generated content combined with captured content (e.g., real-world photographs). The artificial reality content may include video, audio, haptic feedback, or some combination thereof, any of which may be presented in a single channel or in multiple channels (e.g., stereo video that produces a three-dimensional effect to the viewer). Artificial reality may be associated with applications, products, accessories, services, or some combination thereof, that are used to create content in an artificial reality and/or used to perform activities in an artificial reality.

The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers. An HMD typically includes a band that secures the HMD to the head of a user. The band of an HMD plays a crucial role in ensuring a snug fit and preventing slippage or sliding during use. A lack of a comfortable or secure fit may negatively impact user experience and may decrease the usability of the HMD.

SUMMARY

The disclosed system provides for an apparatus for adjusting a tension of a headband of a head-mounted display (HMD). Turning a rotating cap of the apparatus in one direction may increase a tension in the headband. Turning the rotating cap in the opposite direction may decrease a tension in the headband. The apparatus may maintain an increased or a decreased tension without slipping, allowing a user to avoid further or unintentional adjustments to the straps. In some embodiments, an audible sound produced by turning the rotating cap may be reduced by a hard-stop mechanism of the rotating cap.

According to certain aspects of the present disclosure, an apparatus for adjusting a tension of a headband of a head-mounted display (HMD) is provided. The apparatus may include a base plate. The base plate may include a stationary ratchet drum. The apparatus may include a rotating cap positioned over at least the stationary ratchet drum to define an internal space therebetween. The rotating cap may include a plurality of walled structures projecting from an inner surface of the rotating cap and into the internal space. The apparatus may include a ratchet positioned in the internal space. The ratchet may include a plurality of pawls connected to a hub of the ratchet and extending radially from the hub. Each pawl of the plurality of pawls may include a proximal end connected to the hub and a distal end including a head of the pawl. The head may include a plurality of pawl teeth. The head may include a first protrusion projecting transversely to the head and a second protrusion projecting transversely to the first protrusion. The first protrusion may be received within a corresponding walled structure of the plurality of walled structures of the rotating cap. The corresponding walled structure may be configured to guide a pivoting movement of the pawl.

According to another aspect of the present disclosure, a ratchet is provided. The ratchet may include a hub. The ratchet may include a pinion rigidly coupled to the hub. The ratchet may include a plurality of pawls connected to the hub and extending radially from the hub. Each pawl of the plurality of pawls may include a proximal end connected to the hub and a distal end including a head of the pawl. The head may include a plurality of pawl teeth. The head may include a first protrusion projecting transversely to the head and a second protrusion projecting transversely to the first protrusion. The first protrusion may be received within a corresponding walled structure of a plurality of walled structures projecting from an inner surface of a rotating cap. The corresponding walled structure may be configured to guide a pivoting movement of the pawl.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1A:
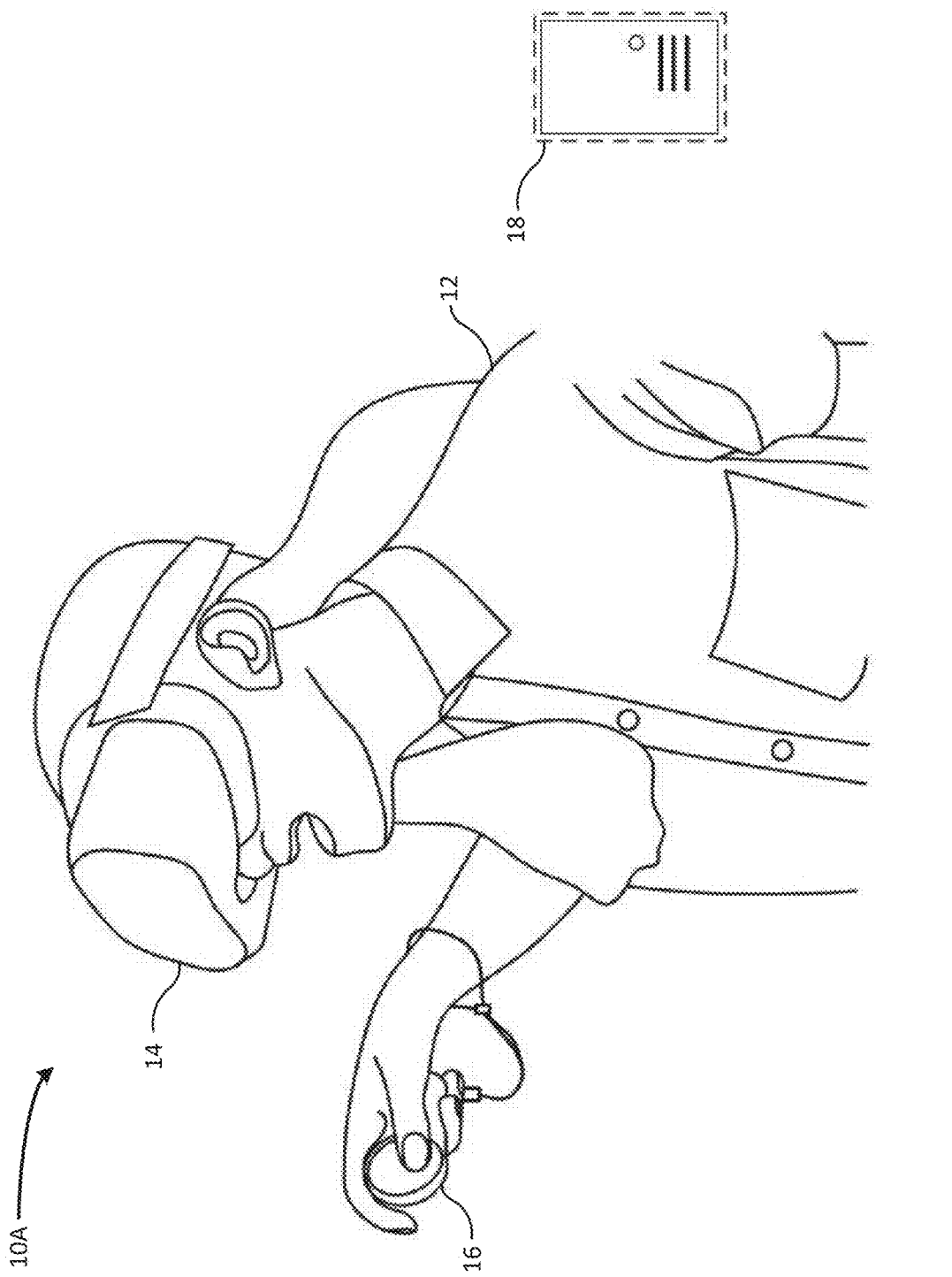
FIG. 1A illustrates an example artificial reality system, according to some embodiments of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive. Those skilled in the art may realize other elements that, although not specifically described herein, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

General Overview

Artificial reality is a form of reality that has been adjusted in some manner before presentation to a user, which may include, for example, a virtual reality (VR), an augmented reality (AR), a mixed reality (MR), a hybrid reality, or some combination and/or derivative thereof. Artificial reality content may include completely generated content or generated content combined with captured content (e.g., real-world photographs). The artificial reality content may include video, audio, haptic feedback, or some combination thereof, any of which may be presented in a single channel or in multiple channels (e.g., stereo video that produces a three-dimensional effect to the viewer). Artificial reality may be associated with applications, products, accessories, services, or some combination thereof, that are used to create content in an artificial reality and/or used to perform activities in an artificial reality.

The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers. An HMD typically includes a band that secures the HMD to the head of a user. The band of an HMD plays a crucial role in ensuring a snug fit and preventing slippage or sliding during use. A lack of a comfortable or secure fit may negatively impact user experience and may decrease the usability of the HMD.

As disclosed herein, novel systems represent a significant advancement in the field of artificial reality systems by providing for an apparatus for adjusting a tension of a headband of a head-mounted display (HMD). Turning a rotating cap of the apparatus in one direction may increase a tension in the headband. Turning the rotating cap of the apparatus in the opposite direction may decrease a tension in the headband. The apparatus may maintain an increased or a decreased tension without slipping, allowing a user to avoid further or unintentional adjustments to the straps. In some embodiments, an audible sound produced by turning the rotating cap may be reduced by a hard-stop mechanism of the rotating cap.

Example System Architecture

FIG. 1A illustrates an example artificial reality system 10A, according to some embodiments of the disclosure. In some embodiments, artificial reality system 10A may include head-mounted display (HMD) 14, controller 16, and computing device 18.

User 12 may wear HMD 14 that may display visual artificial reality content to user 12. HMD 14 may include an audio device that may provide audio artificial reality content to user 12. HMD 14 may include one or more cameras which may capture images or videos of physical environments. HMD 14 may include an eye-tracking system to determine the vergence distance of user 12. HMD 14 may include a microphone to capture voice input from user 12.

Controller 16 may include a trackpad and one or more buttons. Controller 16 may receive inputs from user 12 and relay the inputs to computing device 18. Controller 16 may also provide haptic feedback to user 12. Computing device 18 may be connected to HMD 14 and controller 16 through cables or wireless connections. Computing device 18 may control HMD 14 and controller 16 to provide the artificial reality content to user 12 or receive inputs from user 12. Computing device 18 may be a standalone host computing device, an on-board computing device integrated with HMD 14, a mobile device, or any other hardware platform capable of providing artificial reality content to user 12 or receiving inputs from user 12.

Figure 1B:
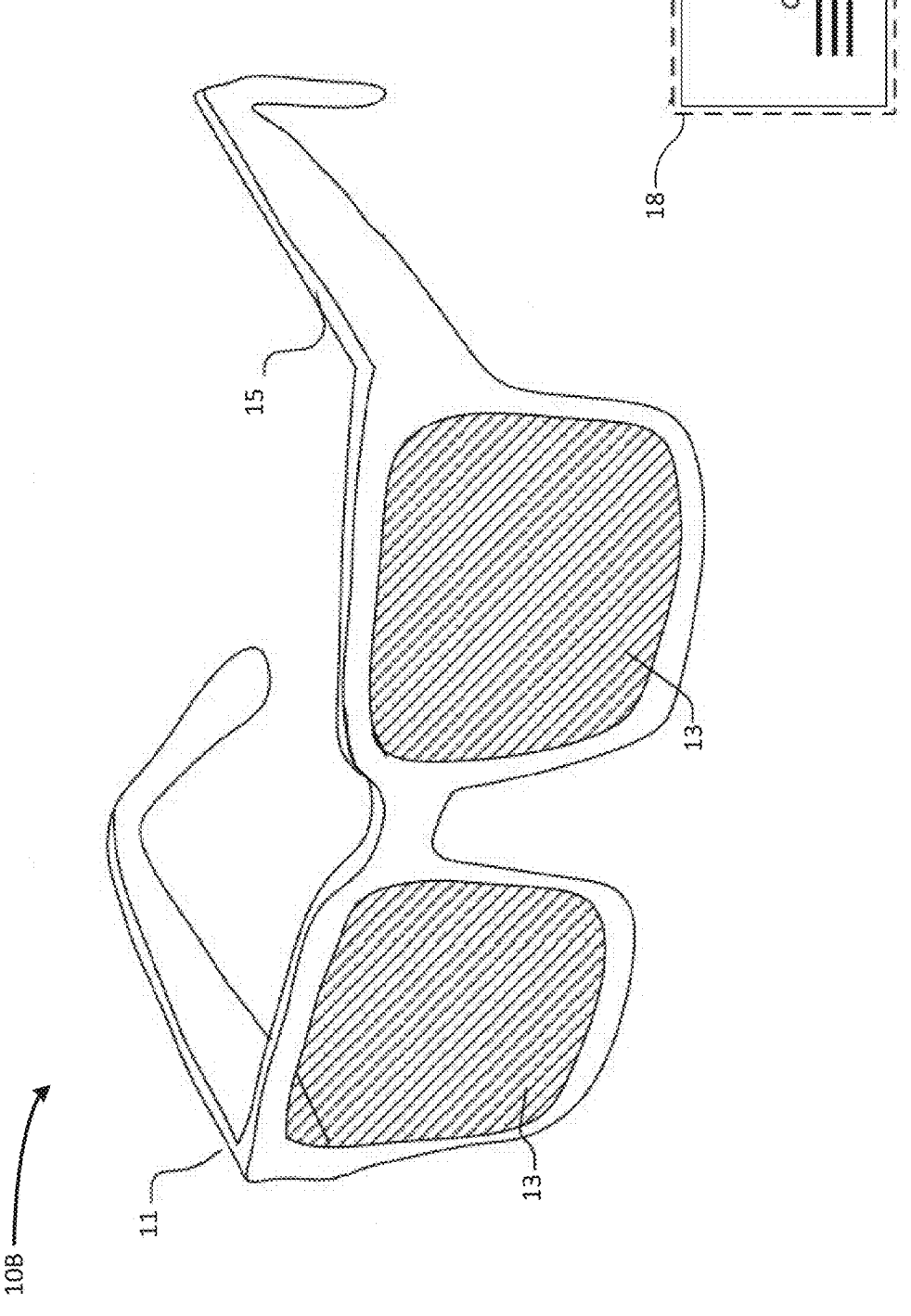
FIG. 1B illustrates an example augmented reality system, according to some embodiments of the disclosure.

FIG. 1B illustrates an example augmented reality system 10B, according to some embodiments of the disclosure.

Augmented reality system 10B may include head-mounted display (HMD) 11 (e.g., glasses) comprising frame 15, one or more displays 13, and computing device 18.

Displays 13 may be transparent or translucent, allowing a user wearing HMD 11 to look through displays 13 to see the real world and displaying visual artificial reality content to the user at the same time. HMD 11 may include an audio device that may provide audio artificial reality content to users. HMD 11 may include one or more cameras that may capture images and videos of real-world environments. HMD 11 may include an eye-tracking system to track the vergence movement of the user wearing HMD 11. HMD 11 may include a microphone to capture voice input from the user.

Augmented reality system 10B may further include a controller comprising a trackpad and one or more buttons. The controller may receive inputs from users and relay the inputs to computing device 18. The controller may also provide haptic feedback to users. Computing device 18 may be connected to HMD 11 and the controller through cables or wireless connections. Computing device 18 may control HMD 11 and the controller to provide the augmented reality content to users and receive inputs from users. Computing device 18 may be a standalone host computer device, an on-board computer device integrated with HMD 11, a mobile device, or any other hardware platform capable of providing artificial reality content to users and receiving inputs from users.

Figure 2:
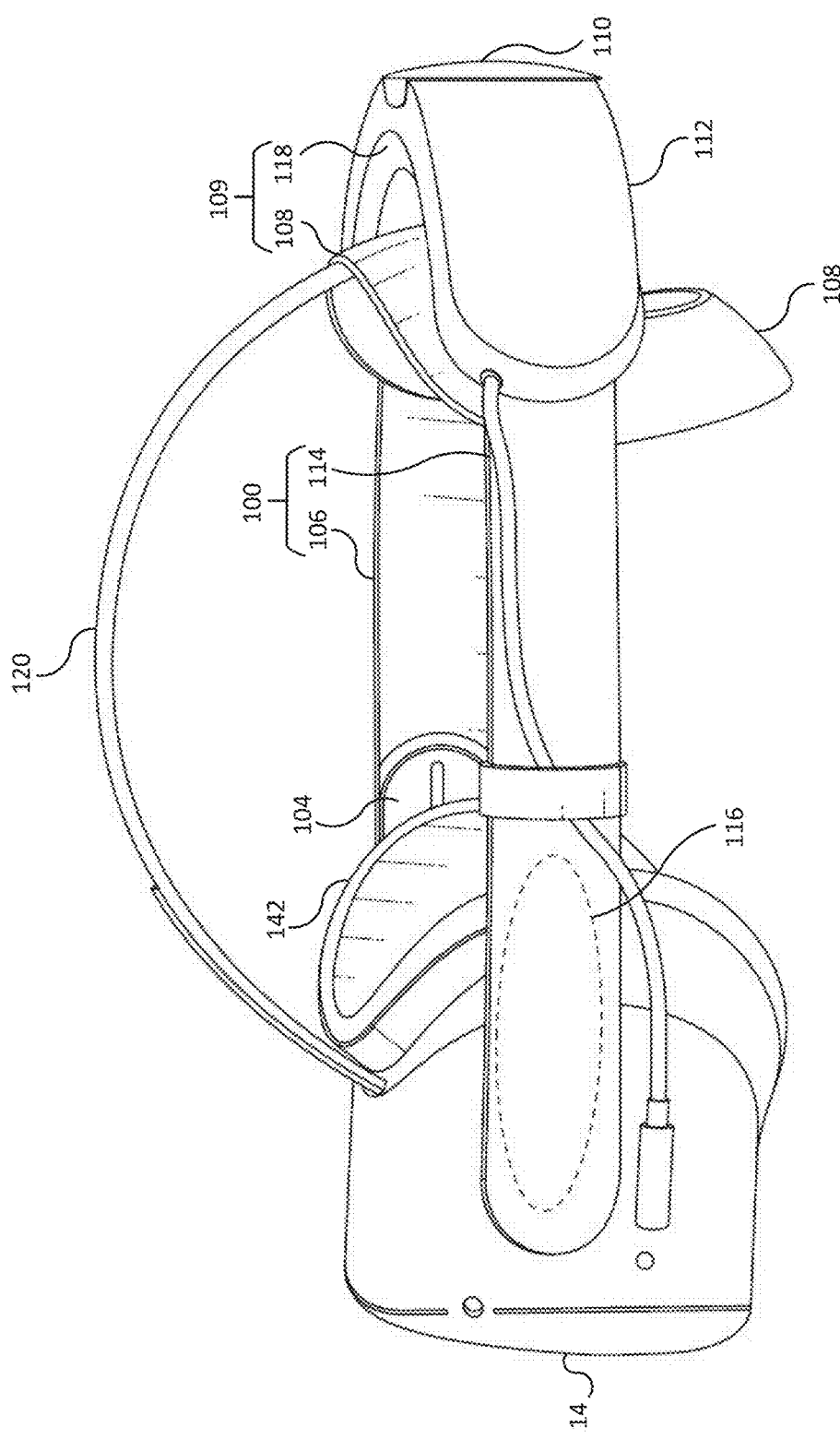
FIG. 2 is a perspective side view of an adjustable band attached to the head-mounted display in FIG. 1A, according to some embodiments of the disclosure.

FIG. 2 is a perspective side view of example adjustable band 100 attached to head-mounted display (HMD) 14 in FIG. 1A, according to some embodiments of the disclosure. Alternatively, adjustable band 100 may be attached to HMD 11 in FIG. 1B. A user may adjust the tension of adjustable band 100 by adjusting a position (e.g., rotating, sliding, etc.) of rotating cap 110. Head cradle 109 may include flexible portion 108 and base portion 118. HMD 14 may include facial interface cushion 142 and upper strap 120. Adjustable band 100 may be configured to attach to or detach from HMD 14. Adjustable band 100 may include right strap 106 that may be attached, affixed, connected, or otherwise coupled to HMD 14. In some examples, right snap piece assembly 104 may be connected to right strap 106, connecting an end of adjustable band 100 to HMD 14. Similarly, adjustable band 100 may include left strap 114 that may be attached, affixed, connected, or otherwise coupled to HMD 14. In some examples, left snap piece assembly 116 may be connected to left strap 114, connecting an end of adjustable band 100 to HMD 14. In some embodiments, left strap 114 and right strap 106 may be made of a rigid material (e.g., rigid plastic (such as acrylonitrile butadiene styrene (ABS) or polyethylene terephthalate glycol (PETG)), polycarbonate, carbon fiber, fiberglass, aluminum).

Left snap piece assembly 116 and right snap piece assembly 104 may provide a detachable connection of adjustable band 100 to HMD 14. The ability to provide a detachable connection of adjustable band 100 to HMD 14 may allow for the swapping or replacement of different adjustable bands on HMD 14.

HMD 14 may be worn by a user by placing HMD 14 on a head of the user so that HMD 14 covers a field of view of the user and facial interface cushion 142 rests comfortably against a region (e.g., a forehead) of a face of the user. When worn in this manner by the user, with right strap 106 and left strap 114 extending back from HMD 14, adjustable band 100 may be positioned on the head of the user so that flexible portion 108 of head cradle 109 rests comfortably on the occipital region of the head of the user. Additional support may be provided by upper strap 120.

Upper strap 120 may be coupled to flexible portion 108 of head cradle 109. In some embodiments, upper strap 120 may instead be coupled to the housing of tensioning apparatus 112. In addition, in some examples, upper strap 120 may be removable and/or omitted.

Figure 3:
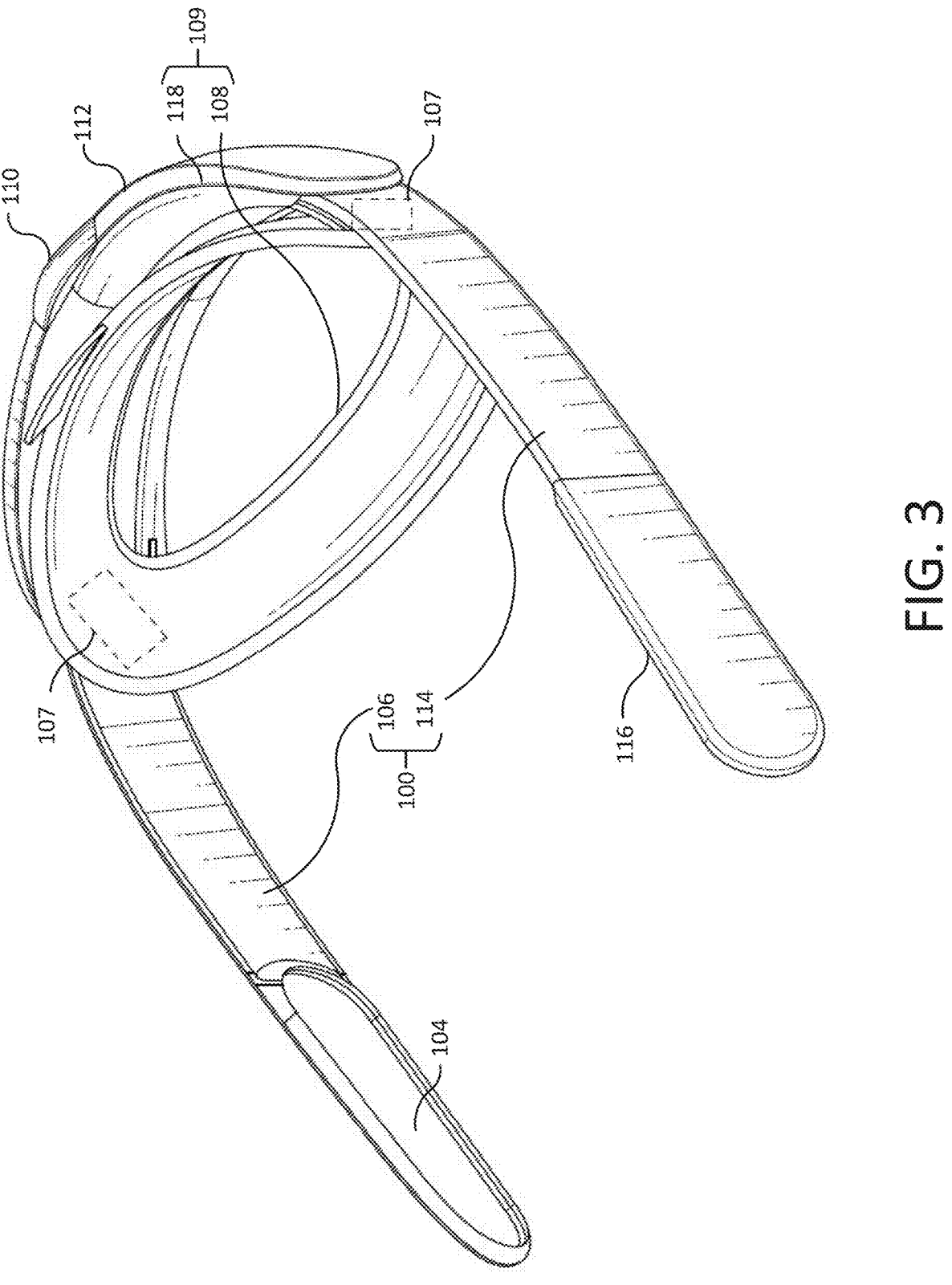
FIG. 3 is a perspective view of the adjustable band in FIG. 2, according to some embodiments of the disclosure.
Figure 4:
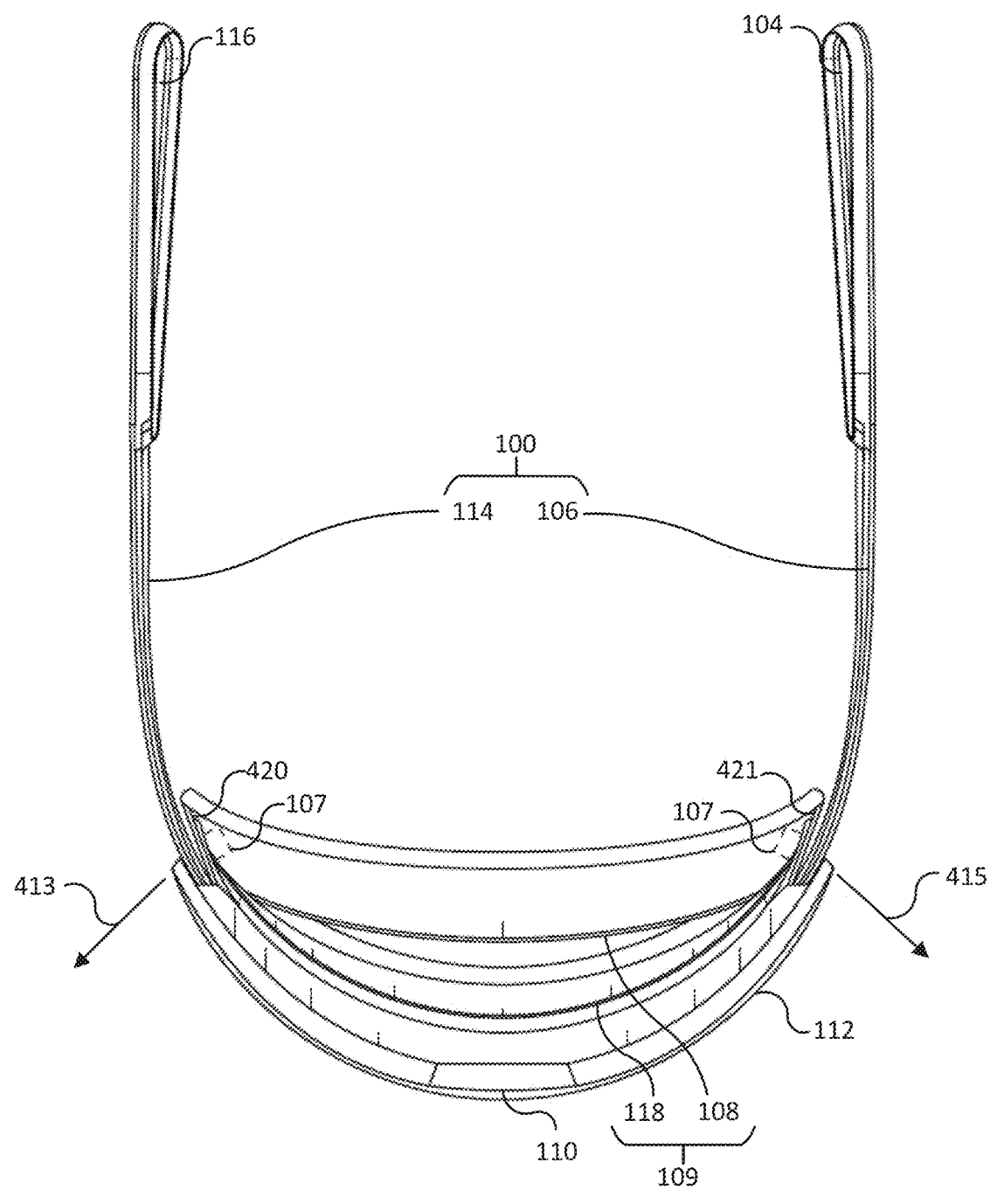
FIG. 4 is a plan view of the adjustable band in FIG. 2, according to some embodiments of the disclosure.

FIG. 3 is a perspective view of adjustable band 100 in FIG. 2, according to some embodiments of the disclosure. FIG. 4 is a plan view of adjustable band 100 in FIG. 2, according to some embodiments of the disclosure. Adjustable band 100 may include head cradle 109 that may conform to the head of a user (e.g., user 12) when the user dons the adjustable band 100. Head cradle 109 may provide a comfortable and secure interface between the head of the user and adjustable band 100. Head cradle 109 may increase user comfort that may be associated with wearing adjustable band 100 attached to an HMD (e.g., HMD 11 or HMD 14) for an extended period of time. Head cradle 109 may include flexible portion 108 that may be positioned and shaped to contact the rear portion (e.g., the occipital region) of the head of the user. Flexible portion 108 may include a material having an elastic modulus that allows flexible portion 108 to conform to the occipital region of the head of the user. Examples of materials included in flexible portion 108 may include, without limitation, thermoplastic polyurethane (TPU) material, two-part expanding foam, silicone, polymer, natural rubber, resin, PVC, silflex, latex, urethane, elastomer, and crystal silicone. In some examples, flexible portion 108 may include an injection molded TPU material. Flexible portion 108 material may exhibit antimicrobial or hypo-allergenic properties.

Head cradle 109 may include base portion 118 that secures head cradle 109 to tensioning apparatus 112. Base portion 118 may be secured to tensioning apparatus 112 by mounting elements (e.g., protrusions, tabs, etc.) in base portion 118 secured to tensioning apparatus 112. In some examples, flexible portion 108 may be secured to base portion 118 using inserts 107.

Adjustable band 100 may be configured to attach to or detach from an HMD. Adjustable band 100 may include right strap 106 that may be attached, affixed, connected, or otherwise coupled to an HMD (e.g., HMD 11 or HMD 14). In some examples, right snap piece assembly 104 may be connected to right strap 106 and configured to connect an end of adjustable band 100 to the HMD. Similarly, adjustable band 100 may include a left strap 114 that may be attached, affixed, connected, or otherwise coupled to the HMD (e.g., HMD 11 or 14). In some examples, a left snap piece assembly 116 may be connected to left strap 114 and configured to connect the other end of adjustable band 100 to the HMD.

In some examples, flexible portion 108 may conform to the rear portion of the head of the user when a force is applied to base portion 118. For example, a force substantially normal to the head of the user and in a direction towards the rear of the head of the user may be applied by tensioning apparatus 112. A user may don adjustable band 100 attached to an HMD. The user may adjust the tension of adjustable band 100 by adjusting a position (e.g., rotating, sliding, etc.) of rotating cap 110. An increase in tension on adjustable band 100 may increase a force between flexible portion 108 and the rear portion of the head of the user that contacts flexible portion 108. Flexible portion 108 may conform to the shape of the rear portion of the head of the user and distribute the force substantially evenly across an inner surface of flexible portion 108 that contacts the rear portion of the head of the user. An even distribution of force across the surface of flexible portion 108 may result in a comfortable fit of adjustable band 100 for the user.

Flexible portion 108 may include a material having an elastic modulus that may allow flexible portion 108 to conform to the occipital region of the head of the user. The material used in flexible portion 108 may have an elastic modulus in the range of less than 0.01 GPa, about 0.01 to 0.1 GPa, about 0.1 to 1 GPa, or about 1 to 5 GPa. In some examples, flexible portion 108 may include a thermoplastic elastomer (e.g., a TPU) material. Flexible portion 108 may be produced using any of a variety of methods, including, without limitation, injection molding, 3D printing, casting, vacuum forming, or thermoforming. In some examples, the flexible portion 108 may have a finish (e.g., elastomeric paint) applied to the surface of flexible portion 108.

Base portion 118 may include left side biasing element 420 and right side biasing element 421. Left side biasing element 420 and right side biasing element 421 may bias flexible portion 108 to a resting (e.g., neutral) position when no tension is applied by tensioning apparatus 112 (e.g., when no force is applied to flexible portion 108). When a user dons adjustable band 100 attached to an HMD and tension is applied to right strap 106 and/or left strap 114 by adjusting a position (e.g., rotating, sliding, etc.) of rotating cap 110, the force of the rear head portion of the user against flexible portion 108 may cause left side biasing element 420 or right side biasing element 421 to flex and/or move. Left side biasing element 420 may flex in a direction substantially parallel to a direction indicated by arrow 413. Right side biasing element 421 may flex in a direction substantially parallel to a direction indicated by arrow 415.

Figure 5:
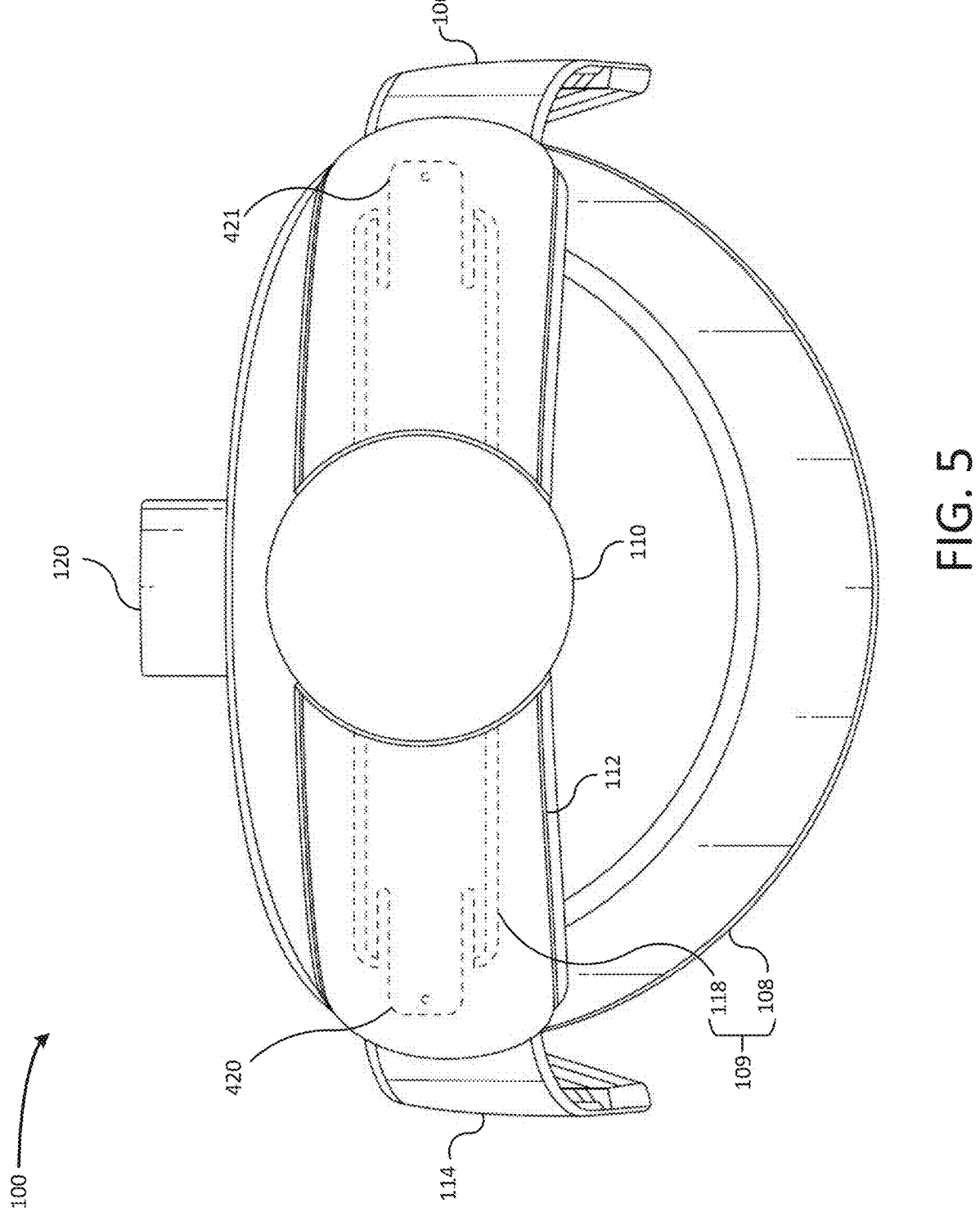
FIG. 5 is a rear view of the adjustable band in FIG. 2, according to some embodiments of the disclosure.

FIG. 5 is a rear view of adjustable band 100 in FIG. 2, according to some embodiments of the disclosure. Head cradle 109 may include flexible portion 108 and base portion 118. Base portion 118 may include left side biasing element 420 and right side biasing element 421 in the form of leaf springs. Rotation of rotating cap 110 may cause a length adjustment mechanism (e.g., ratchet 711) within tensioning apparatus 112 to increase or decrease the length of left strap 114 or right strap 106. For example, when rotating cap 110 is rotated in a clockwise direction, a ratchet (e.g., ratchet 711) may rotate such that the tension increases on left strap 114 or right strap 106 by decreasing the length of left strap 114 or right strap 106. Similarly, when rotating cap 110 is rotated in a counterclockwise direction, a ratchet (e.g., ratchet 711) may rotate such that tension decreases in adjustable band 100 by increasing the length of left strap 114 or right strap 106.

In some examples, adjustable band 100 may include upper strap 120 that is secured to an upper region of flexible portion 108 and extends to an upper portion of the HMD. Additionally or alternatively, upper strap 120 may be secured to an upper region of tensioning apparatus 112 and extend to an upper portion of the HMD. Upper strap 120 may extend over a center portion of the head of a user and provide additional support for adjustable band 100 of the HMD when worn by the user. In some examples, the HMD may be of a lightweight design such that upper strap 120 is not required to support the HMD and adjustable band 100.

Figure 6A:
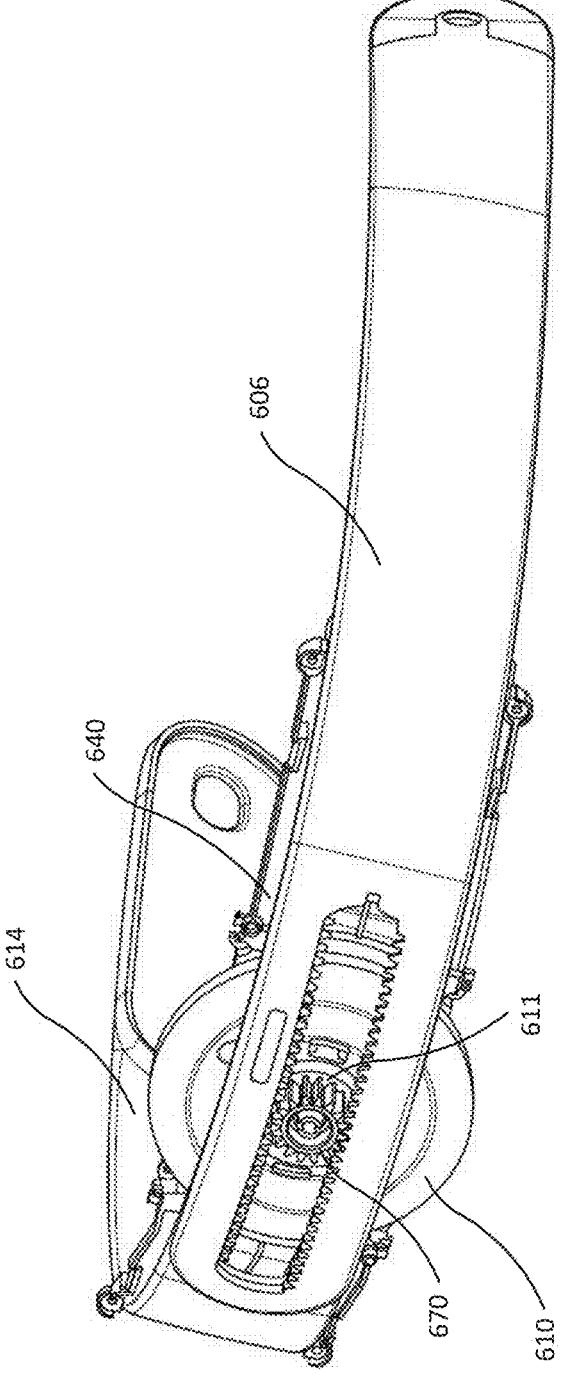
FIG. 6A illustrates a rear perspective view of an example tensioning apparatus for adjusting a tension of a headband of a head-mounted display (HMD), according to some embodiments of the disclosure.
Figure 6B:
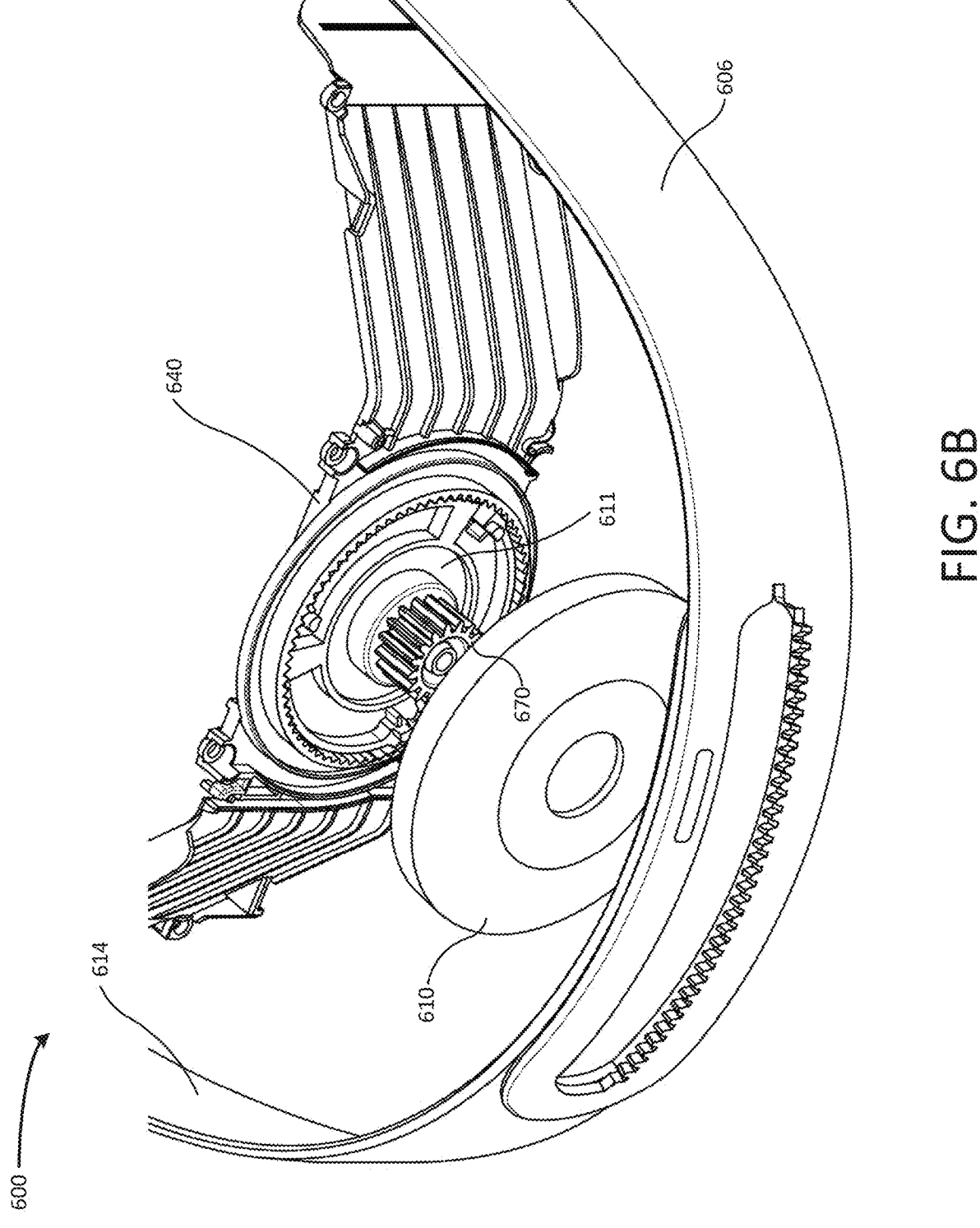
FIG. 6B illustrates an exploded rear perspective view of the example tensioning apparatus in FIG. 6A, according to some embodiments of the disclosure.

FIG. 6A illustrates a rear perspective view of example tensioning apparatus 600 for adjusting a tension of a headband of a head-mounted display (HMD), according to some embodiments of the disclosure. FIG. 6B illustrates an exploded rear perspective view of the example tensioning apparatus 600 in FIG. 6A, according to some embodiments of the disclosure. A headband may include left strap 614 and right strap 606. Tensioning apparatus 600 may include a knob system, which may include rotating cap 610, ratchet 611, and base plate 640. Ratchet 611 may include pinion 670, which may be located in a central region of a central hub of ratchet 611. Pinion 770 may protrude out of an internal space of rotating cap 610, through a central opening of rotating cap 610. In some embodiments, pinion 670 may be attached, affixed, connected, or otherwise coupled to ratchet 611. In some embodiments, pinion 670 may contact, engage, connect to, or otherwise couple with left strap 614 at an end portion of left strap 614, via a plurality of teeth of the end portion of left strap 614. In some embodiments, pinion 670 may contact, engage, connect to, or otherwise couple with right strap 606 at an end portion of right strap 606, via a plurality of teeth of the end portion of right strap 606.

Rotation of rotating cap 610 may cause a length adjustment mechanism (e.g., ratchet 611) within tensioning apparatus 600 to increase or decrease the length of left strap 614 or right strap 606. For example, when rotating cap 610 is rotated in a clockwise direction, a ratchet (e.g., ratchet 611) may rotate such that the tension increases on left strap 614 or right strap 606 by decreasing the distance of a distal end of left strap 614 or a distal end of right strap 606 from the ratchet. Similarly, when rotating cap 610 is rotated in a counterclockwise direction, a ratchet (e.g., ratchet 611) may rotate such that tension decreases on left strap 614 or right strap 606 by increasing the distance of a distal end of left strap 614 or a distal end of right strap 606 from the ratchet.

Figure 7A:
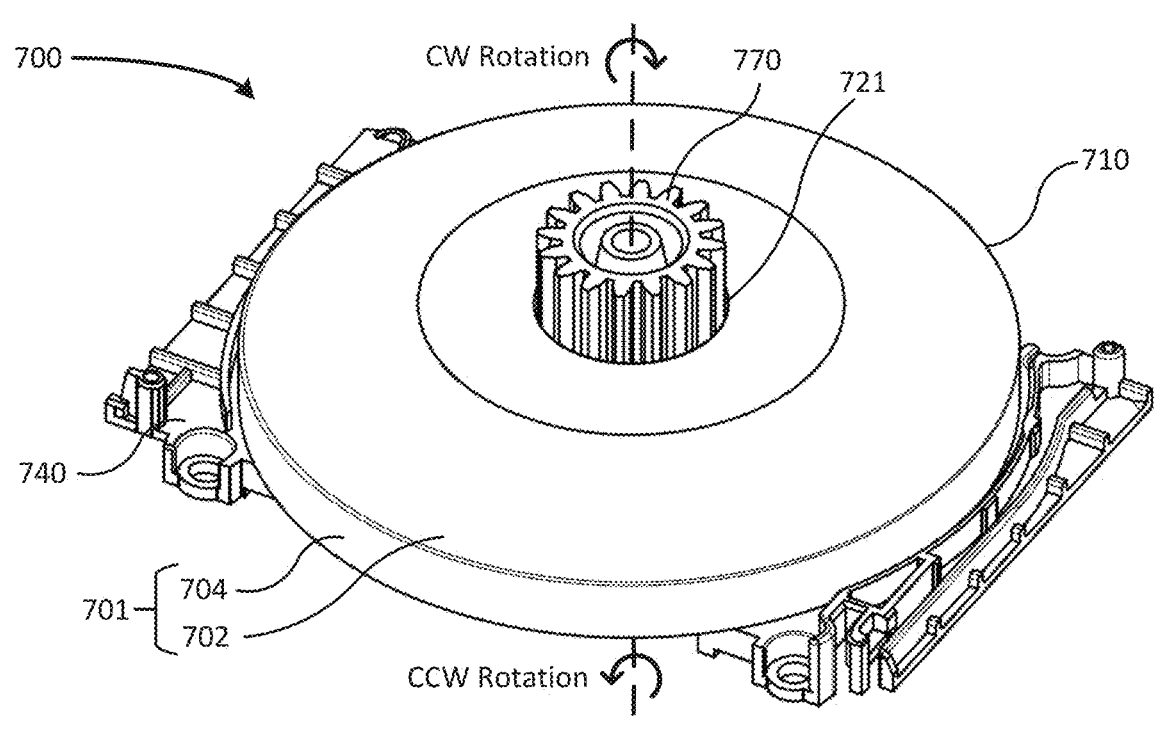
FIG. 7A illustrates an example knob system for adjusting a tension of a headband, according to some embodiments of the disclosure.
Figure 7B:
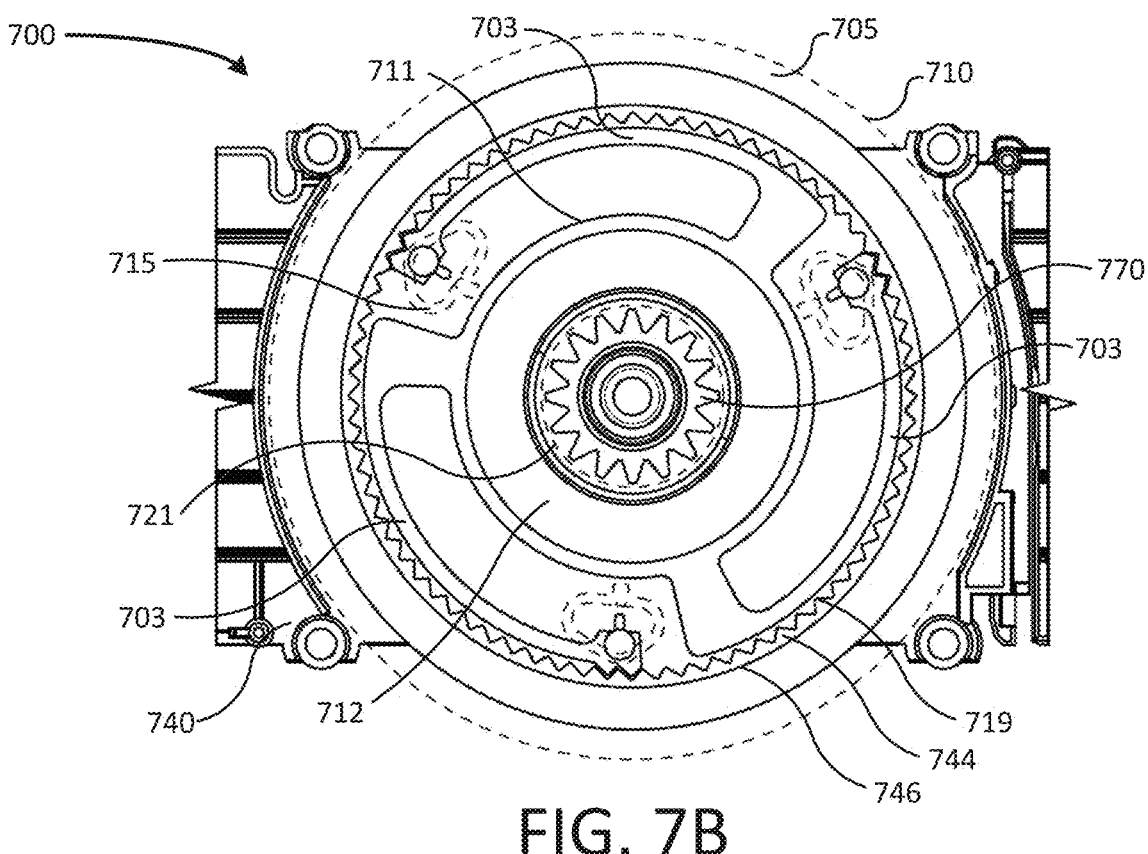
FIG. 7B illustrates an internal structure of a knob system in FIG. 7A, according to some embodiments of the disclosure.
Figure 7C:
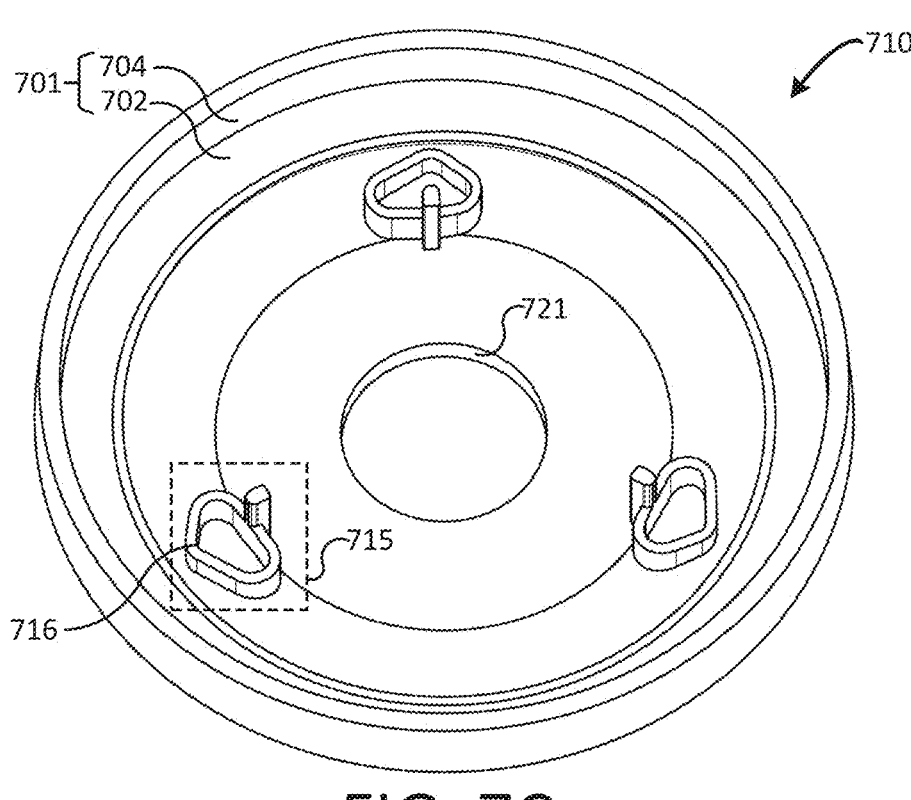
FIG. 7C illustrates a reverse view of the rotating cap of the knob system in FIGS. 7A and 7B, according to some embodiments of the disclosure.

FIG. 7A illustrates example knob system 700 for adjusting a tension of a headband (e.g., adjustable band 100), according to some embodiments of the disclosure. FIG. 7B illustrates an internal structure of knob system 700 in FIG. 7A, according to some embodiments of the disclosure. FIG. 7C illustrates a reverse view of rotating cap 710 of knob system 700 in FIGS. 7A and 7B, according to some embodiments of the disclosure. Knob system 700 may include base plate 740, rotating cap 710, and ratchet 711. Base plate 740 may include stationary ratchet drum 746. Stationary ratchet drum 746 may include inner circumferential surface 744 that may include drum teeth 719 that protrude into internal space 705. Rotating cap 710 may include enclosing structures 715, which may be walled. Ratchet 711 may include central hub 712 and pawls 703.

As illustrated, rotating cap 710 may include cylindrical housing 701 formed by upper plate 702 and lower plate 704 of rotating cap 710. Rotating cap 710 may include central opening 721 in upper plate 702 when upper plate 702 and lower plate 704 are assembled. Upper plate 702 may be positioned over lower plate 704, and rotating cap 710 may be positioned over at least stationary ratchet drum 746 of base plate 740, to form internal space 705. Internal space 705 may be an at least partially enclosed environment formed by upper plate 702 and lower plate 704. As illustrated in FIG. 7B, ratchet 711 may be positioned in internal space 705. A lower side of upper plate 702 may face internal space 705 and may include enclosing structures 715 that protrude or project into internal space 705 from the lower side of upper plate 702. Enclosing structures 715 may enclose therein a space in which portions (e.g., a head of one of pawls 703) of ratchet 711 may be received. In some embodiments, enclosing structures 715 may be spade-shaped structures. Enclosing structures 715 may cooperate with ratchet 711 in order to increase or decrease a tension of a headband, which may include a left strap or a right strap (e.g., left strap 614 or right strap 606), when rotating cap 710 is rotated. The shape of enclosing structures 715 may not be limited to any particular shape, and enclosing structures 715 may have any shape (or size) that permits correct operation in order to increase or decrease the tension of a headband. Internal space 705 may be sized or spaced or otherwise configured such that ratchet 711 may be rotated clockwise or counterclockwise when rotating cap 710 is rotated, but ratchet 711 may be limited from lateral or translational motion.

Figure 7D:
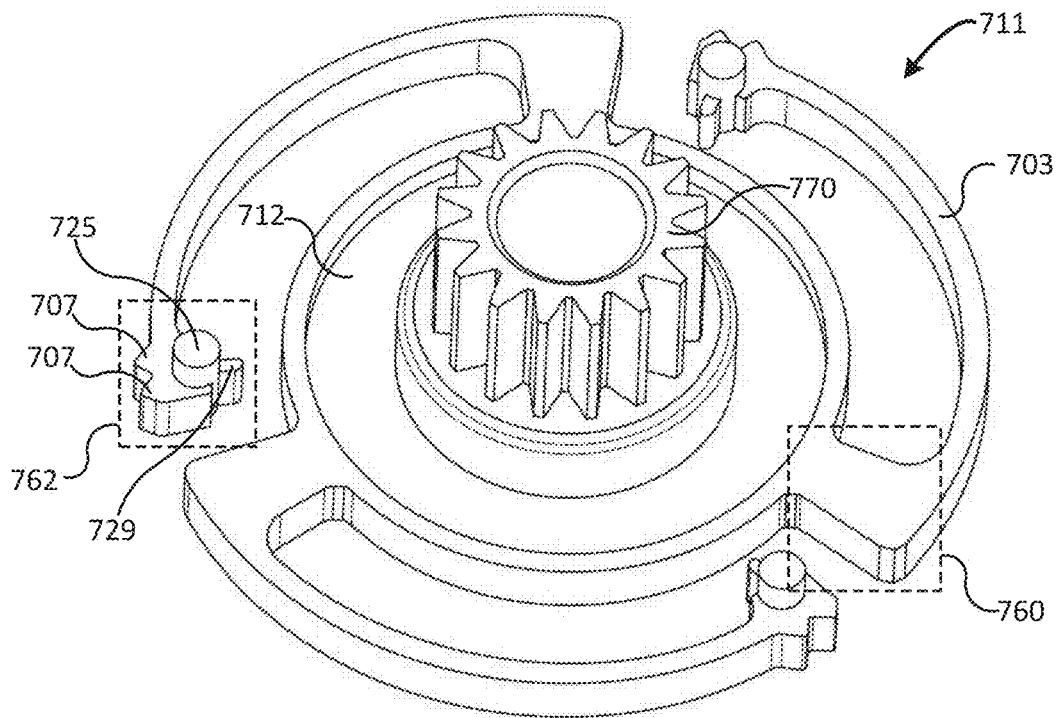
FIG. 7D illustrates the ratchet of the knob system in FIGS. 7A and 7B, according to some embodiments of the disclosure.
Figure 7E:
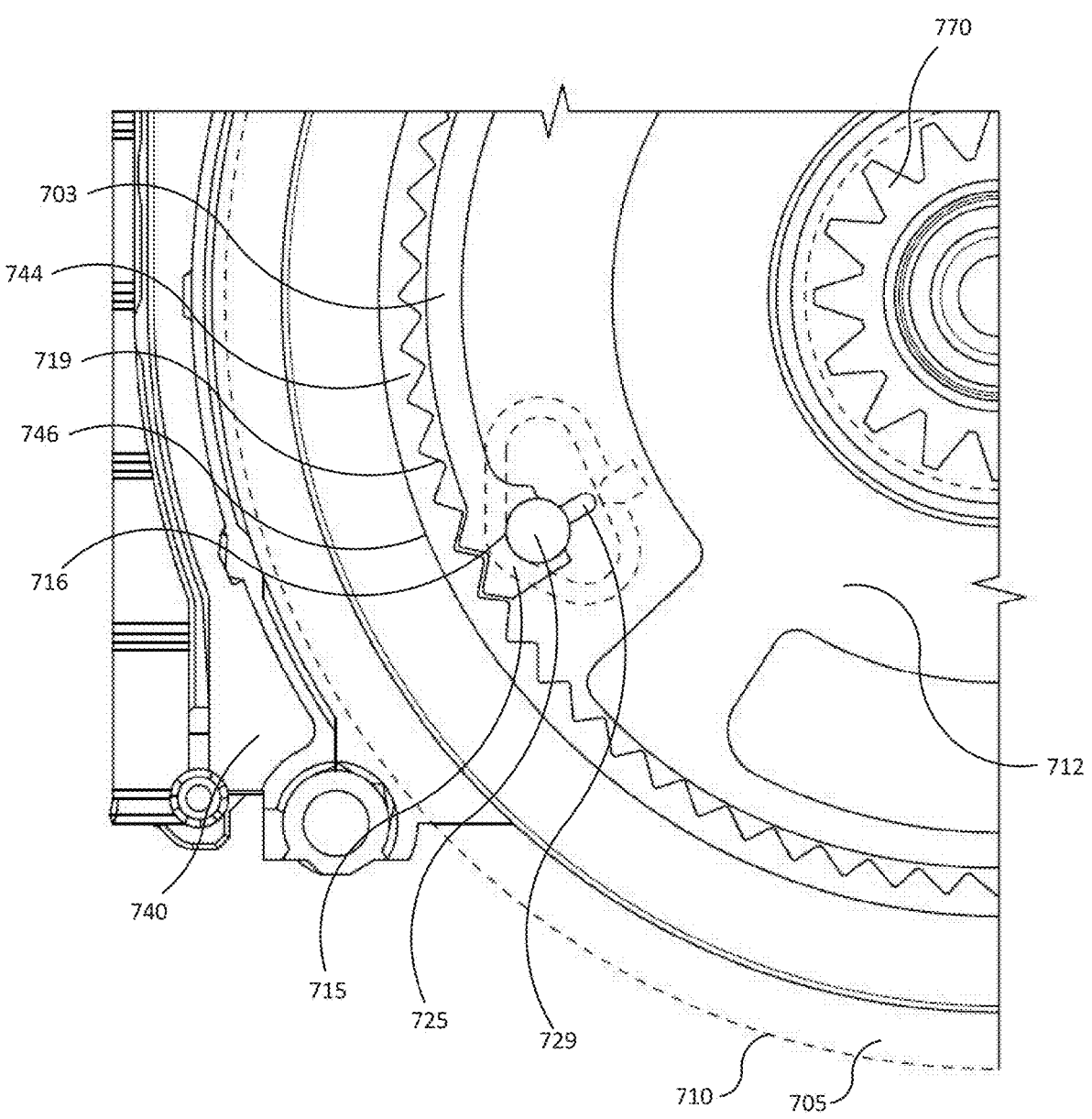
FIG. 7E illustrates a portion of the ratchet in FIGS. 7A-7B and 7D, with a pawl of the ratchet engaging the drum teeth of a stationary ratchet drum, according to some embodiments of the disclosure.
Figure 7F:
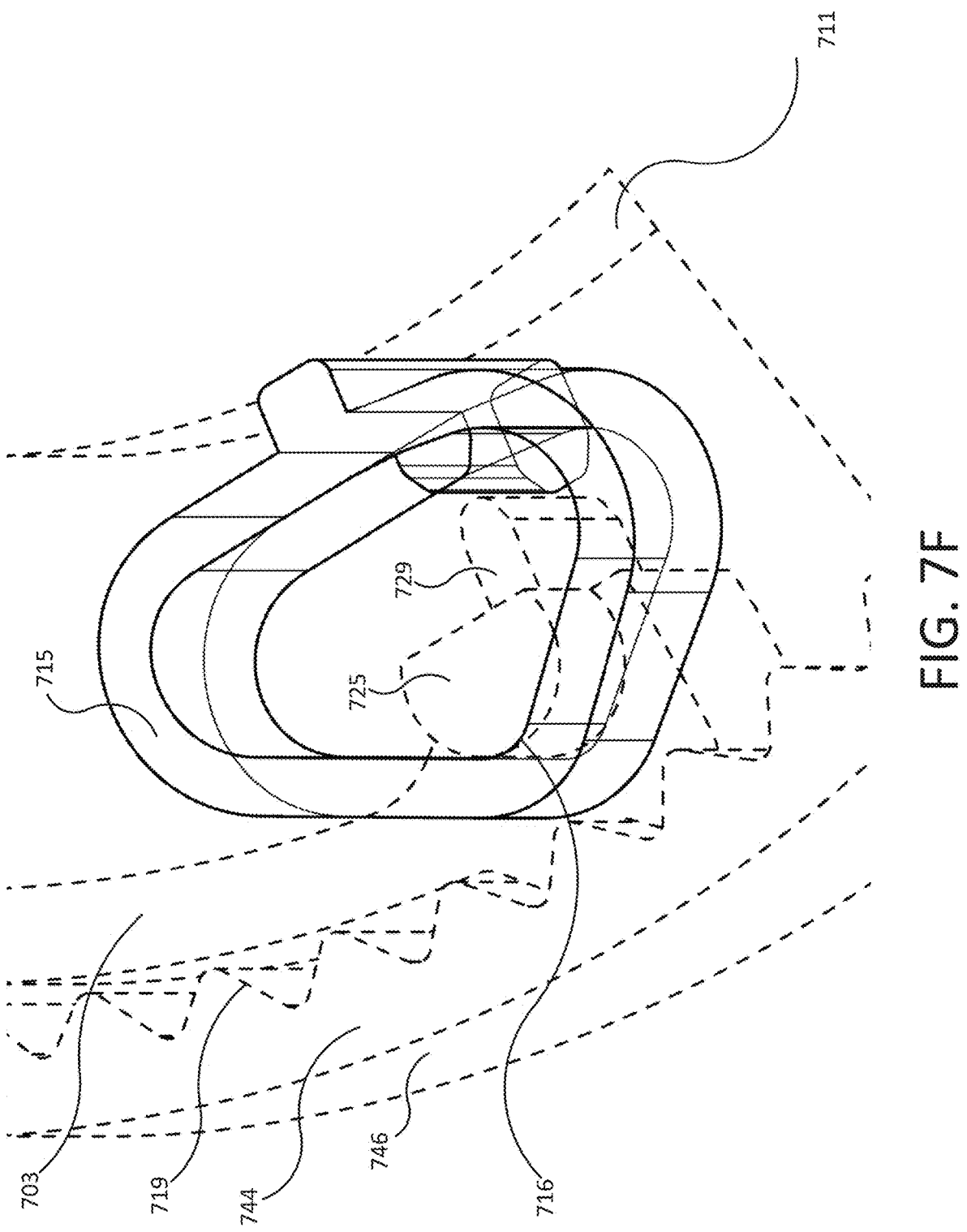
FIG. 7F illustrates a transparent view of an enclosing structure of the rotating cap in FIGS. 7A-7C and 7E, according to some embodiments of the disclosure.

FIG. 7D illustrates ratchet 711 of knob system 700 in FIGS. 7A and 7B, according to some embodiments of the disclosure. FIG. 7E illustrates a portion of ratchet 711 in FIGS. 7A-7B and 7D, with one of pawls 703 of ratchet 711 engaging drum teeth 719 of stationary ratchet drum 746, according to some embodiments of the disclosure. FIG. 7F illustrates a transparent view of an enclosing structure 715 of rotating cap 710 in FIGS. 7A-7C and 7E, according to some embodiments of the disclosure. In FIG. 7F, aspects of enclosing structure 715 are illustrated with solid lines; other aspects of knob system 700 are illustrated with dashed lines.

Ratchet 711 may be a generally circular structure including a central hub 712 having three pawls 703 connected thereto. In some embodiments, ratchet 711 may include two or more than three arms. Each pawl of pawls 703 may include a proximal end connected to central hub 712 via a base portion of the pawl (e.g., base 760), a distal end including a pawl head (e.g., pawl head 762), and a middle portion between the proximal end and the distal end. Each base may extend radially outward from central hub 712. Pawls 703 may be elongated, curved, or arcuate structures each having only one end connected to base 760. An arm (e.g., the middle portion) of each pawl may rest at or approximately at the same radial distance from the center of ratchet 711 when no force acts on pawls 703. The other opposite "free" end (e.g., the distal end) may include pawl head 762, which may include pawl teeth 707 that engage corresponding drum teeth 719 of inner circumferential surface 744 of stationary ratchet drum 746.

Pawls 703 may be resilient, "springboard"-type structures and may bend toward and away from central hub 712 under force. Each arm of pawls 703 may be at the same radial distance from the center of ratchet 711 when no force acts on pawls 703. Pinion 770 may be located in a central region of central hub 712. Pinion 770 may protrude out of housing 701 through central opening 721 in upper plate 702 when upper plate 702 and lower plate 704 are assembled. In some embodiments, pinion 770 may be attached, affixed, connected, or otherwise coupled to a headband, which may include a left strap or a right strap (e.g., left strap 614 or right strap 606), and pinion 770 may apply a torque to the right strap or the left strap, increasing or decreasing tension in the right strap or the left strap when rotating cap 710 is rotated. In some embodiments, knob system 700 may include a spool, and the right strap and the left strap may include cables or laces. In such embodiments, the right strap and the left strap may be wound around the spool, and the spool may apply a torque to the right strap or the left strap, increasing or decreasing tension in the right strap or the left strap when rotating cap 710 is rotated.

Pawl head 762 may include two pawl teeth 707. In some other embodiments, pawl head 762 may include more than two pawl teeth 707. First protrusion 725 (e.g., a cylindrical protrusion) may be located adjacent to pawl teeth 707 and may extend or project transversely to pawl head 762 or transversely to the plane containing ratchet 711. In some embodiments, first protrusion 725 may extend vertically to the plane containing ratchet 711. However, first protrusion 725 may extend at any angle greater than 0° and less than 180°. When upper plate 702 and lower plate 704 are assembled, first protrusion 725 may extend towards upper plate 702. Second protrusion 729 may extend or project transversely to first protrusion 725. Second protrusion 729 may extend radially inward a certain distance from pawl head 762 towards central hub 712. In some embodiments, second protrusion 729 may be in the same plane as pawl teeth 707. In some embodiments, second protrusion 729 and pawl teeth 707 may be in the same plane as central hub 712 and pawls 703.

As illustrated in FIG. 7E, when upper plate 702 is placed on lower plate 704, first protrusion 725 may be received within the space defined by a corresponding enclosed structure of enclosed structures 715. The corresponding enclosed structure may be configured to guide a pivoting movement of a pawl of pawls 703 when ratchet 711 rotates under force from rotating cap 710. In the spade-shaped structures, first protrusion 725 may rest in a groove 716 of the spade-shaped structure. As illustrated, first protrusion 725 may be received within groove 716 of enclosing structure 715. Assuming that an HMD is not worn by a user, in this instance, a torque required to rotate (clockwise or counterclockwise) rotating cap 710 in order to move, for example, a right strap or a left strap of a headband may be relatively less (around 5 N-mm to 6 N-mm). Thus, rotating cap 710 may be rotated with relative ease to move the right strap and the left strap. When rotating cap 710 is rotated, pawls 703 may move radially inward towards central hub 712 and the movement may cause second protrusion 729 to contact a wall of enclosing structure 715. In some embodiments, pawl teeth 707 may be configured to engage with drum teeth 719 and second protrusion 729 may be configured to disengage with the corresponding enclosed structure when rotating cap 710 is in a tension holding configuration (e.g., when rotating cap 710 is not being rotated). In some embodiments, pawl teeth 707 may be configured to disengage with drum teeth 719 and second protrusion 729 may be configured to engage with the corresponding enclosed structure when rotating cap 710 is in a tension increasing configuration or a tension decreasing configuration (e.g., when rotating cap 710 is being rotated).

By contacting the wall of enclosing structure 715, it may be ensured that pawl teeth 707 are engaged with drum teeth 719 and pawl head 762 may be maintained in position within enclosing structure 715. In other words, slippage may be limited and audible sounds may be limited.

After an HMD is worn by a user and the right strap and the left strap are tightened as desired by rotating the rotating cap 710 to secure the HMD to the head of the user, a relatively higher torque (around 27 N-mm) may be required to move the right strap and the left strap. After the HMD is secured on the head of the user, the tension in the right strap and the left strap may be maintained so that the right strap and the left strap are retained in place. This is because a substantially higher torque (around 3500 N-mm) may be required for the right strap and the left strap to loosen without rotating cap 710 being rotated. In other words, the right strap and the left strap may need to overcome the substantially higher torque in order to snap out of place. This high torque may be achieved because of second protrusion 729 contacting the wall of enclosing structure 715. This contact may ensure that pawl teeth 707 are engaged with drum teeth 719 and slippage is limited. In this case, tension in the right strap and the left strap may cause the right strap and the left strap to loosen, and the contact between second protrusion 729 and the walls of the enclosing structure 715 may limit disengagement of pawl teeth 707 and drum teeth 719.

Figure 8:
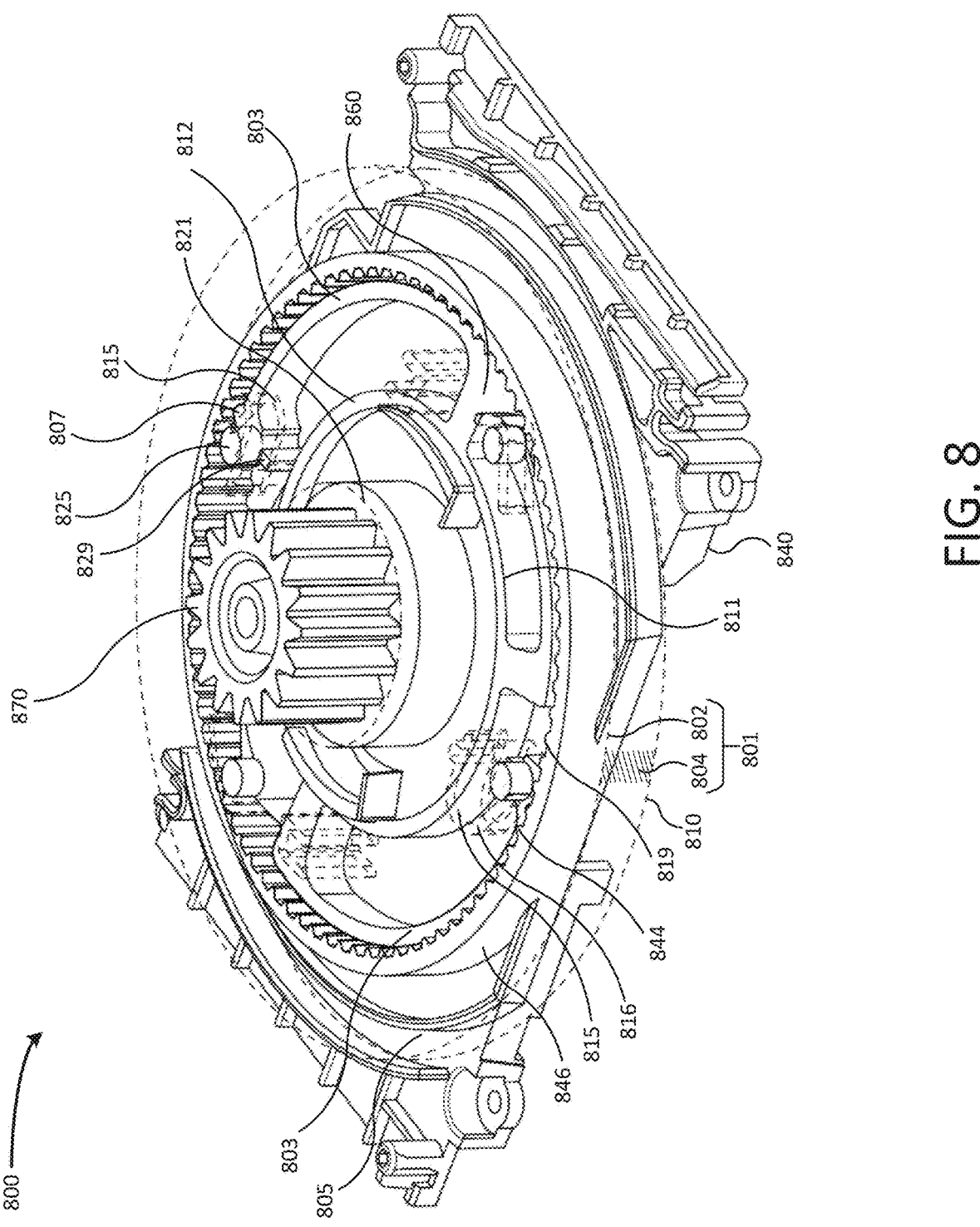
FIG. 8 illustrates a perspective view of an internal structure of an example knob system for adjusting a tension of a headband, according to some embodiments of the disclosure.

FIG. 8 illustrates a perspective view of an internal structure of example knob system 800 for adjusting a tension of a headband, according to some embodiments of the disclosure.

Knob system 800 may include base plate 840 (shown in solid lines), rotating cap 810 (shown in dashed lines and parallel hatching), and ratchet 811 (shown in solid lines). Base plate 840 may include stationary ratchet drum 846. Stationary ratchet drum 846 may include inner circumferential surface 844 that may include drum teeth 819 that protrude into internal space 805. Rotating cap 810 may include enclosing structures 815, which may be walled. Ratchet 811 may include central hub 812 and pawls 803.

As illustrated in FIG. 8, rotating cap 810 may include cylindrical housing 801 formed by upper plate 802 and lower plate 804, a portion of which is indicated by the parallel hatching in FIG. 8. Rotating cap 810 may include central opening 821 in upper plate 802 when upper plate 802 and lower plate 804 are assembled. Upper plate 802 may be positioned over lower plate 804 and rotating cap 810 may be positioned over at least stationary ratchet drum 846 of base plate 840, to form internal space 805. Internal space 805 may be an at least partially enclosed environment formed by upper plate 802 and lower plate 804. As illustrated, ratchet 811 may be positioned in internal space 805. A lower side of upper plate 802 may face internal space 805 and may include enclosing structures 815 that may protrude or project into internal space 805 from the lower side of upper plate 802. Enclosing structures 815 may enclose therein a space in which portions (e.g., a head of one of pawls 803) of ratchet 811 may be received. In some embodiments, enclosing structures 815 may be "C"-shaped structures. Enclosing structures 815 may cooperate with ratchet 811 in order to increase or decrease a tension of a headband, which may include a left strap or a right strap (e.g., left strap 614 or right strap 606), when rotating cap 810 is rotated. The shape of enclosing structures 815 may not be limited to any particular shape, and enclosing structures 815 may have any shape (or size) that permits correct operation in order to increase or decrease the tension of a headband. Internal space 805 may be sized or spaced or otherwise configured such that ratchet 811 may be rotated clockwise or counterclockwise when rotating cap 810 is rotated, but ratchet 811 may be limited from lateral or translational motion.

Ratchet 811 may be a generally circular structure including a central hub 812 having two pawls 803 connected thereto. In some embodiments, ratchet 811 may include more than two arms. Each pawl of pawls 803 may include a proximal end connected to central hub 812 via a base portion of the pawl (e.g., base 860), a distal end including a pawl head, and a middle portion between the proximal end and the distal end. Each base may extend radially outward from central hub 812. Pawls 803 may be elongated, curved, or arcuate structures each having only one end connected to base 860. An arm (e.g., the middle portion) of each pawl may rest at or approximately at the same radial distance from the center of ratchet 811 when no force acts on pawls 803. The other opposite "free" end (e.g., the distal end) may include a pawl head, which may include pawl teeth 807 that engage corresponding drum teeth 819 of inner circumferential surface 844 of stationary ratchet drum 846.

The pawl head may include at least two pawl teeth 807. A first protrusion 825 (e.g., a cylindrical protrusion) may be located adjacent to pawl teeth 807 and may extend or project transversely to the pawl head or transversely to the plane containing ratchet 811. In some embodiments, first protrusion 825 may extend vertically to the plane containing ratchet 811. However, first protrusion 825 may extend at any angle greater than 0° and less than 180°. When upper plate 802 and lower plate 804 are assembled, first protrusion 825 may extend towards upper plate 802. Second protrusion 829 may extend or project transversely to first protrusion 825. Second protrusion 829 may extend radially inward a certain distance from the pawl head towards central hub 812. In some embodiments, second protrusion 829 may be in the same plane as pawl teeth 807. In some embodiments, second protrusion 829 and pawl teeth 807 may be in the same plane as central hub 812 and pawls 803.

Pawls 803 may be resilient, "springboard"-type structures and may bend toward and away from central hub 812 under force. Each arm of pawls 803 may be at the same radial distance from the center of ratchet 811 when no force acts on pawls 803. Pinion 870 may be located in a central region of central hub 812. Pinion 870 may protrude out of the housing through central opening 821 in upper plate 802 when upper plate 802 and lower plate 804 are assembled. In some embodiments, pinion 870 may be attached, affixed, connected, or otherwise coupled to a headband, which may include a left strap or a right strap (e.g., left strap 614 or right strap 606), and pinion 870 may apply a torque to the right strap or the left strap, increasing or decreasing tension in the right strap or the left strap when rotating cap 810 is rotated. In some embodiments, knob system 800 may include a spool, and the right strap and the left strap may include cables or laces. In such embodiments, the right strap and the left strap may be wound around the spool, and the spool may apply a torque to the right strap or the left strap, increasing or decreasing tension in the right strap or the left strap when rotating cap 810 is rotated.

When upper plate 802 is placed on lower plate 804, first protrusion 825 may be received within the space defined by a corresponding enclosed structure of enclosed structures 815. The corresponding enclose structure may be configured to guide a pivoting movement of a pawl of pawls 803 when ratchet 811 rotates under force from rotating cap 810. In the "C-shaped structures, first protrusion 825 may rest in a groove 816 of the "C"-shaped structure. First protrusion 825 may be received within groove 816 of enclosing structure 815. Assuming that an HMD is not worn by a user, in this instance, a torque required to rotate (clockwise or counterclockwise) rotating cap 810 in order to move, for example, a right strap or a left strap of a headband of the HMD may be relatively less (around 5 N-mm to 6 N-mm). Thus, rotating cap 810 may be rotated with relative ease to move the right strap and the left strap. When rotating cap 810 is rotated, pawls 803 may move radially inward towards central hub 812 and the movement may cause second protrusion 829 to contact a wall of enclosing structure 815. In some embodiments, pawl teeth 807 may be configured to engage with drum teeth 819 and second protrusion 829 may be configured to disengage with the corresponding enclosed structure when rotating cap 810 is in a tension holding configuration (e.g., when rotating cap 810 is not being rotated). In some embodiments, pawl teeth 807 may be configured to disengage with drum teeth 819 and second protrusion 829 may be configured to engage with the corresponding enclosed structure when rotating cap 810 is in a tension increasing configuration or a tension decreasing configuration (e.g., when rotating cap 810 is being rotated).

By contacting the wall of enclosing structure 815, it may be ensured that pawl teeth 807 are engaged with drum teeth 819 and the pawl head may be maintained in position within the corresponding enclosing structure, limiting both slippage and audible sounds.

The tensioning apparatus (e.g., tensioning apparatus 112), according to the embodiments disclosed, may advantageously limit loosening of the straps of the HMD and thereby secure the HMD to the head of the user.

General Notes on Terminology

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

The subject matter of this specification has been described in terms of particular aspects, but other aspects may be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims may be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems may generally be integrated together in a single software product or packaged into multiple software products. Other variations are within the scope of the following claims.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the clauses that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user. Method clauses may be provided to present elements of the various steps, operations, or processes in a sample order, and are not meant to be limited to the specific order or hierarchy presented.

Although illustrative embodiments have been shown and described, a wide range of modification, change, and substitution are contemplated in the foregoing disclosure and in some instances, some features of the embodiments may be employed without a corresponding use of other features. Those of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An apparatus for adjusting a tension of a head-mounted display (HMD), comprising:
  a base plate including a stationary ratchet drum;
  a rotating cap positioned over at least the stationary ratchet drum to define an internal space therebetween, the rotating cap including a plurality of walled structures projecting from an inner surface of the rotating cap and into the internal space; and a ratchet positioned in the internal space and including a plurality of pawls connected to a hub of the ratchet and extending radially from the hub, wherein each pawl of the plurality of pawls includes a proximal end connected to the hub and a distal end including a head of the pawl, the head including:

a plurality of pawl teeth, a first protrusion projecting transversely to the head, and a second protrusion projecting transversely to the first protrusion, wherein the first protrusion and the second protrusion are received within a corresponding walled structure of the plurality of walled structures of the rotating cap and wherein the corresponding walled structure is configured to guide a pivoting movement of the pawl.

2. The apparatus of claim 1, further comprising a first strap and a second strap made of a rigid material.

3. The apparatus of claim 2, wherein the ratchet includes a pinion coupled to the ratchet at the hub, coupled to the first strap at a first end of the first strap, and coupled to the second strap at a second end of the second strap.

4. The apparatus of claim 2, wherein:

a first rotation of the rotating cap in a first rotational direction increases a tension in the first strap and the second strap; and a second rotation of the rotating cap in a second rotational direction opposite the first rotational direction decreases the tension in the first strap and the second strap.

5. The apparatus of claim 4, wherein:

the first rotational direction includes a clockwise direction; and the second rotational direction includes a counterclockwise direction.

6. The apparatus of claim 1, wherein:

each pawl of the plurality of pawls includes an arm; and each arm is a same radial distance from a center of the ratchet.

7. The apparatus of claim 1, wherein the second protrusion contacts a wall of the corresponding walled structure.

8. The apparatus of claim 1, wherein the stationary ratchet drum includes a plurality of drum teeth on an inner circumferential surface of the stationary ratchet drum, and wherein the plurality of pawl teeth cooperate with the drum teeth.

9. The apparatus of claim 8, wherein the plurality of pawl teeth are configured to engage with the drum teeth and the second protrusion is configured to disengage with the corresponding walled structure when the rotating cap is in a tension holding configuration.

10. The apparatus of claim 8, wherein the plurality of pawl teeth are configured to disengage with the drum teeth and the second protrusion is configured to engage with the corresponding walled structure when the rotating cap is in a tension increasing configuration or a tension decreasing configuration.

11. A ratchet, comprising:

a hub;

a pinion rigidly coupled to the hub; and a plurality of pawls connected to the hub and extending radially from the hub, wherein each pawl of the plurality of pawls includes a proximal end connected to the hub and a distal end including a head of the pawl, the head including:

a plurality of pawl teeth, a first protrusion projecting transversely to the head, and a second protrusion projecting transversely to the first protrusion, wherein the first protrusion and the second protrusion are received within a corresponding walled structure of a plurality of walled structures projecting from an inner surface of a rotating cap and wherein the corresponding walled structure is configured to guide a pivoting movement of the pawl.

12. The ratchet of claim 11, wherein the second protrusion contacts a wall of the corresponding walled structure.

13. The ratchet of claim 11, wherein:

the rotating cap is positioned over a stationary ratchet drum to define an internal space therebetween;

the plurality of walled structures projects into the internal space; and the ratchet is positioned in the internal space.

14. The ratchet of claim 13, wherein the stationary ratchet drum includes a plurality of drum teeth on an inner circumferential surface of the stationary ratchet drum, and wherein the plurality of pawl teeth cooperate with the drum teeth.

15. The ratchet of claim 14, wherein the plurality of pawl teeth are configured to engage with the drum teeth and the second protrusion is configured to disengage with the corresponding walled structure when the rotating cap is in a tension holding configuration.

16. The ratchet of claim 14, wherein the plurality of pawl teeth are configured to disengage with the drum teeth and the second protrusion is configured to engage with the corresponding walled structure when the rotating cap is in a tension increasing configuration or a tension decreasing configuration.

17. The ratchet of claim 11, wherein:

the pinion is coupled to a first strap at a first end of the first strap; and the pinion is coupled to a second strap at a second end of the second strap.

18. The ratchet of claim 17, wherein:

a first rotation of the rotating cap in a first rotational direction increases a tension in the first strap and the second strap; and a second rotation of the rotating cap in a second rotational direction opposite the first rotational direction decreases the tension in the first strap and the second strap.

19. The ratchet of claim 18, wherein:

the first rotational direction includes a clockwise direction; and the second rotational direction includes a counterclockwise direction.

20. The ratchet of claim 11, wherein:

each pawl of the plurality of pawls includes an arm; and each arm is a same radial distance from a center of the ratchet.

* * * * *